United States Patent

[11] 3,556,414

[72] Inventor David H. Eberly, Jr.
 Fairfield, Conn.
[21] Appl. No. 708,837
[22] Filed Feb. 28, 1968
[45] Patented Jan. 19, 1971
[73] Assignee United States Banknote Corporation
 N.Y.
 a corporation of Virginia

[54] METHOD AND APPARATUS FOR DISRUPTING CELLS
 34 Claims, 6 Drawing Figs.
[52] U.S. Cl................................................... 241/1,
 241/2, 241/301
[51] Int. Cl...................................................... B02c 19/18,
 B02c 19/00; A61k 23/00
[50] Field of Search........................................... 241/1, 2,
 301, 5, 39, 38; 424/92; 195/(Inquired);
 18/(Inquired)

[56] References Cited
 UNITED STATES PATENTS
 2,928,614 3/1960 Emanuel...................... 241/39
 3,165,266 1/1965 Blum.............................. 241/1
 3,253,791 5/1966 Cohn............................ 241/5X
 3,257,080 6/1966 Synder......................... 241/5
 3,309,032 3/1967 Filz................................ 241/1X
 2,473,453 6/1949 Shropshire.................. 241/2X

*Primary Examiner*—Robert C. Riordon
*Assistant Examiner*—Donald G. Kelly
*Attorney*—Cushman, Darby and Cushman ABSTRACT: A mass of plant or animal cells in the form of a viscous paste are introduced into a compression chamber, and are compressed or compacted by a reciprocating plunger rod under relatively high pressure of at least 10,000 p.s.i. The mass of cells are then disrupted by being intermittently discharged to a relatively low pressure environment, such as atmospheric pressure, by passing through a dynamic orifice defined by a vibrating or oscillating polished disc and a cooperating sealing ring assembly. The oscillating disc and sealing ring assembly function as a heat sink which prevents excessive heating of the cell mass during discharge in order to preclude denaturation of the the cells. The mode of oscillation of the disc is such that it restricts the cell discharge to a thin-film radial discharge of monocellular thickness, thus eliminating the possibility of cell buffering or cushioning in the vertical plane, thereby ensuring a high yield of subcellular components.

INVENTOR
DAVID H. EBERLY, JR

BY
Cushman, Darby & Cushman
ATTORNEYS

METHOD AND APPARATUS FOR DISRUPTING CELLS

BRIEF DESCRIPTION OF THE INVENTION

This invention relates to a method and apparatus for disrupting cells. The cells are ruptured or fractionated in order to prepare subcellular components such as enzymes, microsomes and nucleic acids from microbial life and other organic forms. The cells may comprise plant cells such as yeast, or animal cells such as mouse liver cells.

The object to be achieved by cell disruption is to collect as high a yield as possible of the subcellular components while simultaneously precluding damage to the various constituents of the cell.

There are however, several problems which arise with respect to achieving this objective. For example, it is quite dangerous to subject the cellular structure to excessive heating, since this causes denaturation of the cells. In other words, the nature of the cell would be changed during the rupture thereof. This is highly undesirable since the cell components tend to be inextricably mingled with the cell wall, thus defeating the basic objective of cell disruption, namely, the segregation of subcellular components for subsequent use.

Another aspect of the overall problem, which is related to the aforementioned heating problem, arises if the cell mass is frozen in order to combat excessive heating. The freezing process tends to destroy the enzymic organization of the cell, which of course is unacceptable, since it tends to solve one aspect of the problem while creating a second equally serious problem.

A third facet of the problem, particularly where the cell specimen consists of a paste rather than a liquid suspension, concerns the emission or discharge of a relatively large quantity of cells which are to be exposed to the disruptive forces, and/or the discharge of a mass of cells of multilayered shape or configuration. In both cases, the multiplicity of cells tend to act as buffers or cushions for one another, thereby interfering with or neutralizing the effect of the disruptive forces. Cell buffering is undesirable, since many of the cells remain undisrupted resulting in a low yield of subcellular components.

A basic method for disrupting a cellular structure is known as explosive decompression. In this method the cell structure is subjected to a sudden, substantial decrease in pressure, which disrupts or explodes the cellular structure, thus liberating the subcellular components for collection and subsequent use.

The disruption is usually accomplished by extruding the cell mass through an extremely small (on the order of fifty-millionths of an inch) static orifice, which normally results in a tremendous quantity of heat being generated due to friction during extrusion. Since heating above 35° C. is considered harmful to the organisms, the effectiveness of this process is severely limited unless extensive cooling equipment and/or processes are employed. Consequently, the organism requires freezing of the mass prior to treatment. However, as mentioned above, freezing results in extensive damage to the enzymic organization and is thus unacceptable.

An alternative to freezing the cell mass prior to extrusion through a minute static orifice is to continually cool the cell mass as it is subjected to explosive decompression. This is accomplished by circulating a cooling fluid through an appropriate cooling system which is located adjacent to the cell chamber in order to prevent excessive heating of the cells. Illustrative of this method are U.S. Pat. Nos. 3,165,266 and 3,309,032. A system of this nature however, is also unacceptable since it perforce requires a large quantity of complicated cooling equipment which is expensive to purchase and difficult to maintain. Moreover, the cell specimen must be in the form of a liquid suspension rather than a paste. Thus, the resulting yield is necessarily rather small, because of the diluted nature of all liquid suspensions.

Systems which disrupt a cell structure in the form of a viscous paste have, of course, been previously proposed. However, these systems have not successfully coped with the cell buffering problem which has been mentioned above. Accordingly, these systems have produced an intolerably low percentage of yield of the subcellular components.

It is apparent therefore, that the basic objective of cell disruption (that is, a high yield of subcellular components without damaging the cell constituents) has yet to be attained. The prior methods of cell disruption have been less than successful in achieving the objective because they have failed to solve one or more of the problems associated with cell disruption.

The present invention solves the problems which have heretofore been associated with cell disruption by the employment of a process which will be termed "oscillator-discharge explosive decompression." Essentially, the invention rigidly controls both the quantity and shape of the cell discharge, in order to eliminate the tendency of the mass of cells to cushion or buffer one another during discharge, thereby frustrating effective disruption. Secondly, the cells are discharged through a dynamic orifice which includes an oscillating disc in which the entire surface of the disc functions together with a cooperating O-ring as a heat sink or heat-absorber, thereby obviating the need for an elaborate cooling system or freezing of the cells.

The manner in which these results are achieved will be discussed more fully in the brief description of the method and apparatus of the invention which follows:

The cell culture, which may be a viscous paste composed of plant or animal cells, is inserted in an appropriate pressure cavity or chamber. This chamber is formed by a pressurized rod or plunger, a polished disc which is capable of either natural or controlled oscillation, and the housing for the apparatus in general. After the pressure chamber has been charged with the cell culture, the cell disruption cycle is initiated by applying a relatively high pressure of at least 10,000 p.s.i. to the rod or plunger in such a manner that it tends to compact or compress the viscous paste mass against the polished disc. The polished disc possesses a compound mode of oscillation which includes an orbital component and a vertical component. Accordingly, a dynamic orifice of revolution, formed by the polished disc and a cooperating flexible sealing ring assembly, is generated; moreover, the dynamic orifice is of variable rectilinear dimension. The frequency of oscillation of the disc is in the audible range and above, and may consist of either a natural frequency of at least 8000 c.p.s. or it may be a controlled mode of oscillation of a least 15 c.p.s. The natural frequency is established by the natural behavior of the selected disc geometry and the cooperating ring assembly, while the controlled frequency of oscillation is established by the beating of a pair of springs which are fixed in opposition to one another.

After the cell mass has been exposed to the above-mentioned static pressure for a predetermined time period, the length of which is dependent upon the type of cells involved, cell mass discharge is commenced. Since the maximum height of the dynamic orifice, as determined by its mode of oscillation, varies from zero to less than 4 microns, it is apparent that the amount or quantity of cell discharge in any given period will necessarily be small. Also, the mode of oscillation is such that the cells will be radially discharged in the shape of ribbons or streams, in a random pattern, rather than in the shape of a complete disc or wafer. This will further diminish the quantity of cell discharge. Thus, it will be difficult for the cells to buffer one another during discharge because they simply do not possess the requisite bulk or volume to cushion one another from the tremendous disruptive force which awaits them.

Moreover, the cells are compelled by the nature or mode of oscillation of the dynamic orifice to assume a thin-film configuration as they are discharged. The discharging cell mass actually assumes a shape in which the thickness of the film is essentially monocellular. Thus, since the discharging cell mass is essentially two-dimensional, the possibility of cell buffering in the vertical plane is eliminated, thereby exposing each discharged cell to an explosive decompression force which should be sufficient to disrupt it.

Therefore, by providing both "quantity" and "shape" control of the cell mass, the present invention has succeeded in obviating the cell buffering problem which has plagued prior cell disruption attempts.

Furthermore, as the cells undergo this thin-film radial discharge of monocellular thickness, any tendency toward excessive heating of the cells is prevented by the polished disc itself, the entire surface of which functions as a heat sink or heat-absorber for the heat generated during discharge. The resilient O-ring also assists in the heat-sinking procedure. Since the diameter of the polished disc may be 4 inches and the circumference of the dynamic orifice may be approximately 11 inches, it is apparent that the surface area which is available for heat-sinking is more than adequate. Thus, the possibility of denaturation caused by excessive heating occurring, as well as the necessity for freezing the cell mass, has been eliminated by the present invention.

At this point, incremental portions of the cell mass are being intermittently discharged from the high-pressure chamber or cavity in a random pattern due to the mode of oscillation of the dynamic orifice, which consists of a vertical component of oscillation and an orbital component. The cells are then discharged to a relatively low pressure environment, which may be at atmospheric pressure, through a plurality of radial slots which are formed at spaced intervals in the lower surface of a disc nut. The disc nut is threadedly engaged within the housing of the apparatus, and is positioned just above the polished disc so that the radial slots are in communications with the dynamic orifice.

When the discharged cells are exposed to the relatively low atmospheric pressure, each cell is subjected to a sudden substantial decrease in pressure, which disrupts or explodes the cellular structure, thus liberating the subcellular components. These components are then collected in any suitable manner and are processed for subsequent use.

Employment of the aforedescribed method and apparatus for disrupting cells results in a completely effective solution of the problem which has been outlined above. Not only is a high yield or breakage rate achieved, but the process is accomplished without cell buffering and without denaturation or freezing of the cells. In other words, the cell structure is effectively disrupted, but it is in no way damaged.

In addition to the advantages mentioned above, other advantages of this invention will become apparent in the more detailed description which follows. In the more detailed description of the invention, reference will be made to the accompanying drawings in which:

FIG. 6 is a schematic or diagrammatic view of the system which generates the pressure applied to the plunger rod.

DETAILED DESCRIPTION OF THE INVENTION

Figure 1:
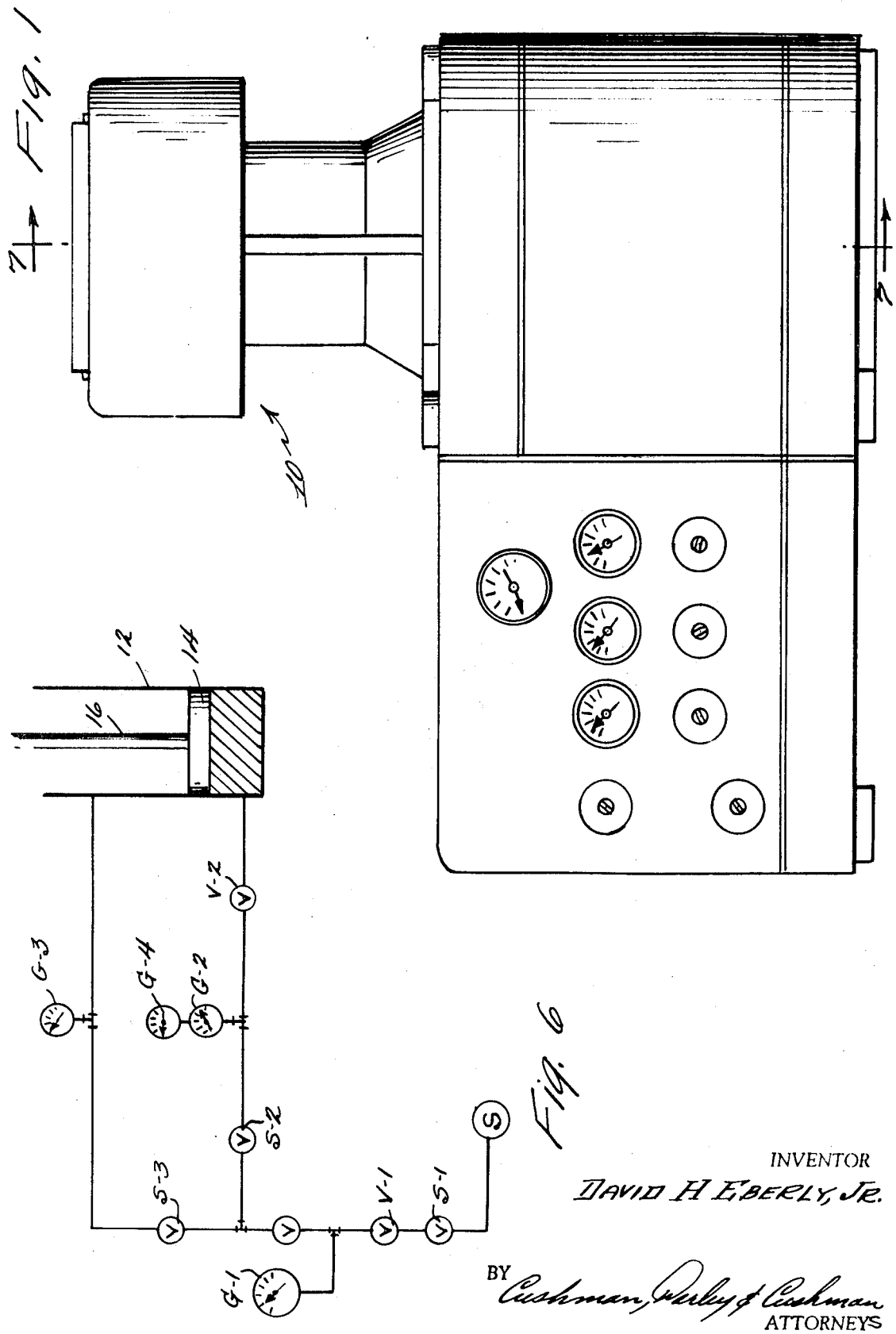
FIG. 1 is a front elevation view of the apparatus, including the outer housing and the various gauges and dials of the device.

Referring to FIG. 1 of the drawings, an elevated view of the apparatus is depicted, including the outer housing 10 and the various dials or gauges for recording pressures throughout the hydraulic fluid system. These pressure indicators enable an operator of the device to continually monitor each cell disruption cycle.

Figure 2:
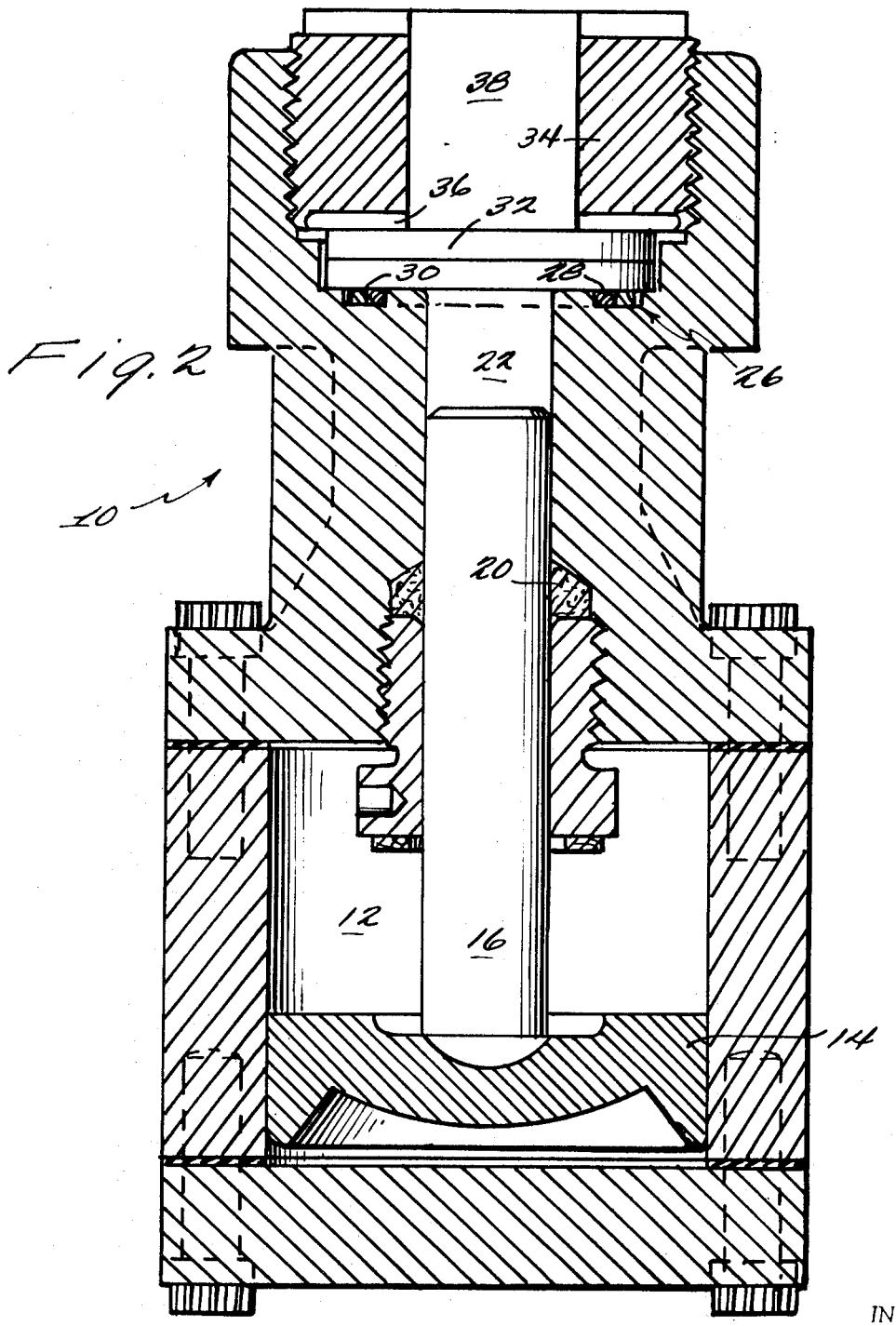
FIG. 2 is a cross-sectional view of the unit taken through line 7–7 of FIG. 1, as viewed along the direction of the arrows.

FIG. 2 is a cross-sectional view of the device through line 7–7 of FIG. 1, looking in the direction of the arrows. The device includes a cylinder 12 which houses a piston 14. A piston rod 16 is connected to the piston 14. Rod 16 slides through a threaded nut 18 and an associated packing gland 20. The unattached end of the rod 16 partially defines a cell cavity or pressure chamber 22, the remainder of which is defined by the surface of the inner wall of housing 10, polished disc 32, and flexible sealing ring assembly 26.

Figure 3:
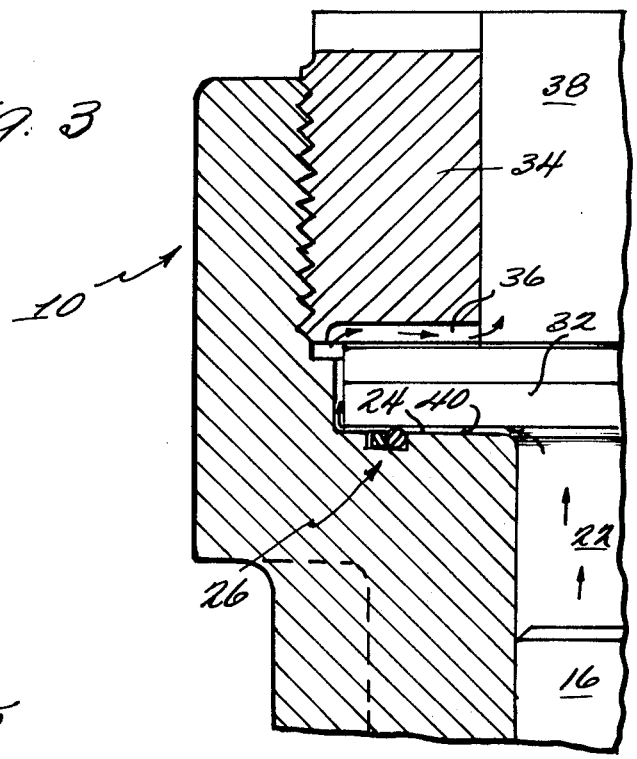
FIG. 3 is a detailed view of the upper left hand portion of FIG. 2, the arrows depicting the flow of the cell mass through the disc slots and into the atmospheric environment.
Figure 5:
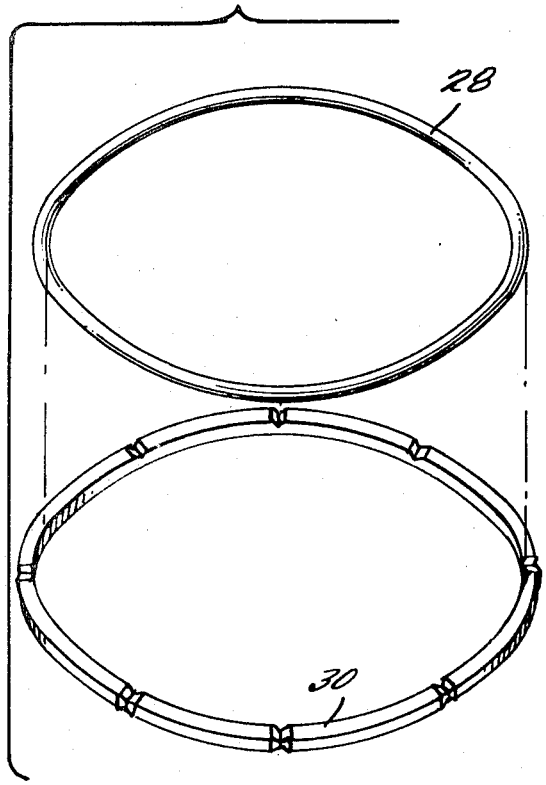
FIG. 5 is an exploded view of the outer notched support ring and the O-ring which fits within it.
Figure 4:
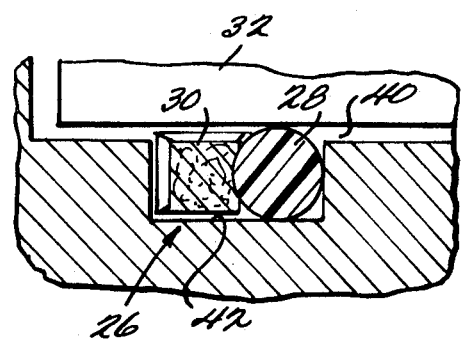
FIG. 4 is a detailed view of the O-ring and outer retaining ring resting against the base of the polished disc.

Referring now to FIGS. 3, 4 and 5, sealing ring assembly 26 is comprised of a resilient O-ring 28 which is positioned within a concentric flexible support or side ring 30. Polished disc 32 is seated in a disc seat 24 which is slightly tapered or rounded at the point where it joins the main portion of cell cavity 22. The sealing ring assembly 26 is received in an annular recess or groove 42 which is formed in the tapered seat 24.

Polished disc 32 is capable of undergoing various modes of oscillation in a manner which will be more fully described subsequently. When the disc is oscillating, a dynamic orifice 40 is formed between the disc 32 and the nip of the O-ring 28 of the sealing ring assembly 26, on which the disc partially rests. A hollow disc nut 34 is threadedly engaged with the inner wall of the housing 10 and is situated on top of the disc 32. The disc nut includes a plurality of spaced radial slots 36, one end of each of the slots being in communication with pressure chamber 22 via dynamic orifice 40, and the other end communicating with a relatively low pressure environment or area 38.

Turning now to FIGS. 2 and 6 of the drawings, a specified pressure supply S is in fluid communication with the cylinder 12. All valves shown in FIG. 6 are closed prior to the beginning of a cell disruption cycle. When preparing for the initiation of a cell disruption cycle, disc nut 34 and disc 32 are removed, and cell cavity 22 is charged with an appropriate cell culture or specimen. While the specimen normally consists of a mass of yeast cells and water in the form of a viscous paste or slurry (e.g. SAE 40 average), it may also comprise other plant cells such as Streptococcus faecalis, Escherichia colli, Micrococcus or analogous microbial forms. If desired, animal cells such as mouse liver cells may also be effectively disrupted. The polished disc 32 and disc nut 34 are then reinserted, the disc nut being set at a given torque.

A cell disrupting cycle is commenced by opening valve S-1. When gauge G-1 indicates the correct static pressure, valve S-2 is slowly opened, allowing the pressurized fluid to act on the piston 14, which results in a rod load of approximately 15 tons on the plunger rod 16. Rod 16 consequently moves under pressure and compresses or compacts the cell mass. The polished disc oscillates at a predetermined frequency, thereby forming a dynamic orifice 40 of varying dimensions located between the disc and the nip of O-ring 28. Incremental portions of the highly-pressurized cell mass are intermittently discharged through the dynamic orifice 40 to the radial slots 36. Here the discharging cell mass is exposed to a sudden, substantial decrease in pressure because they are entering the relative-low pressure environment 38. This explosive decompression causes disruption of the cellular structure and consequent liberation of the subcellular components. These components are then collected in any suitable manner and are processed for subsequent use.

When the gauge G-3 indicates the correct or proper rise in pressure, all of the cell mass has been discharged or ejected from the pressure cavity 22. The cycle is continued by closing S-1 and S. Then valve S-3 is opened to equalize the pressure in the cylinder 12. Valve S-2 is closed and V-2 is opened in order to vent the pressure acting against the rod 16, whereupon the pressure remaining in the cylinder which is indicated at gauge G-3 will return the rod 16 and piston 14 to its original position. By opening valve V-1, venting the system, and closing all valves, a new disruptive cycle can be initiated.

Turning now to a discussion of the specific dimensions, pressures, allowable ranges, values etc. for a preferred embodiment of the invention, the housing 10 is approximately 14 inches high and 7¾ inches in diameter at its widest point. The housing is constructed from 20 percent elongation stainless steel with a minimum tensile strength of 70,000 p.s.i. Cylinder 12 is approximately 4.6 inches high and has a bore or inner diameter of 5 inches. The connection of the cylinder with the pressure system is depicted schematically in FIG. 6 of the drawings. Cylinder 12 is fabricated to withstand safe working loads of 2550 p.s.i. Piston 14 has a diameter of 5 inches, is 1.5 inches high and is comprised of brass and an alloy of nickel. Attached to the piston in a conventional manner is rod 16; the rod is comprised of bronze and has a minimum tensile strength of 45,000 p.s.i., with a 15 percent elongation. The overall length of the rod is about 7 inches and it has a maximum diameter of 1.5 inches. The rod is curved at its "piston" end and is slightly beveled at its "cell cavity" end. While it is normally under a rod load of 15 tons during a disruption cycle, it is fabricated to withstand safe working loads of 25 tons. Threaded nut 18, together with associated packing gland 20, is positioned within the inner bore of the housing 10 such that a portion of rod 16 is adapted to slide through the coaxial openings of the nut 18 and gland 20. Threaded nut 18 is comprised of the same material as piston 14, that is, brass and an alloy of nickel.

Cell cavity or pressure chamber 22 consists of a cylindrical cavity which is defined by the surface of the inner wall or bore of housing 10, polished disc 32, and flexible sealing ring assembly 26. The cell cavity 22 has a diameter or bore of 1.5 inches. The capacity of the cavity will vary greatly, depending on whether a laboratory or industrial machine is contemplated. A laboratory model could be constructed with a charge capacity of anywhere from 40 to 4,000 cc.; the capacity of an industrial model would be much greater. The cavity has a spring constant or modulus of elasticity (that is, Young's Modulus) of $30 \times 10^6$ p.s.i. Each of the specimens which are placed within the cavity will have different static pressures applied thereto, depending upon the particular microbial form which is being disrupted. Thus, after appropriate testing, torque selections which sustained the most appropriate static pressures for efficient disruption or breakage were found to be as follows:

| Cell | Pressure, p.s.i | Disruption, Percent |
| --- | --- | --- |
| Yeast | 18,850 | 75 |
| *Streptoccocus faecalis* | 17,200 | 90 |
| *Escherichia colli* | 12,200 | 75 |

Cell cavity 22 is fabricated to withstand safe work loads of 30,000 p.s.i.

Disc seat 24 is slightly greater than 4 inches in diameter, and the base of the seat which is adjacent to cell cavity 22 is slightly tapered, for a reason more fully described hereinafter. The disc seat also has an annular recess or groove 42 formed therein which is adapted to receive the flexible sealing ring assembly 26.

Referring particularly to FIGS. 4 and 5 of the drawings, the sealing ring assembly 26 is comprised of resilient O-ring 28 which is positioned within a concentric flexible support ring 30. The support ring or backing ring 30 has an inner diameter which is greater than the outer diameter of the resilient O-ring 28. The support ring is comprised of a 50 percent metal-filled teflon material.

As is best shown in FIG. 5 of the drawings, support ring 26 possesses a plurality of V-shaped notches which are spaced along the periphery of the ring. This unique notching configuration has been found to be advantageous in the development of the cell disrupting apparatus. Normally, where an O-ring and support ring are concentrically arranged and are subjected to significant pressures or torques, the inner O-ring could be expected to "nibble" and lock the sealing assembly tight. This phenomenon is known as the "nibbling effect." The aforedescribed notching configuration however, enables one to pretorque sealing ring assembly without incurring the risk of having the expanding O-ring lock the sealing ring assembly tight.

The O-ring is comprised of a resilient material such as rubber of a composition of 90 durometer. The spring constant or mode of elasticity for the O-ring is $1 \times 10^6$ p.s.i. Therefore, the modulus ratio for the O-ring 28 and the cell cavity 22 is 30:1.

The sealing nip between the resilient O-ring 28 and the disc 32 (see FIG. 4 of the drawings) is also deemed to be quite important. It is preferred that the O-ring portion of the sealing ring assembly 26 "squeeze" or compress about 20 percent when the disc 32 and the tapered seat 24 are locked metal-to-metal tight. Contact at the nip between the O-ring 28 and the lower surface of disc 32 is a function of many parameters such as the torque setting, material modulus of the O-ring 28, diameter of the O-ring, surface conditions, temperature and so forth.

The polished disc 32 is preferably of annular configuration. It may be 4 inches in diameter and .2 inch thick. Disc 32 is capable of oscillation at either a natural or controlled frequency. If it is desired to oscillate the disc at a natural frequency, the mode of oscillation will be essentially determined by the geometry of the disc and the associated or cooperating elements. These elements include tapered seat 24, cell cavity 22, and flexible sealing ring assembly 26. The frequency of oscillation will be in the audible range and above, and may be as low as 8,000 cycles per second.

While the natural frequency embodiment may be employed under most circumstances it is desirable, especially when sophisticated applications of the apparatus are contemplated, to utilize a controlled or first frequency of vibration in order to oscillate the polished disc 32. In this case, oscillation can be established by the beating of two springs which are fixed in opposition to each other. The springs (which are not shown in the drawings) are energized by a thin fluid film which passes between the springs in bands of width .125 to inch. inches. The film passes in random order around the circumference of the disc and ring. While the controlled frequency of oscillation is also generally in the audible range and above, it may be as low as 15 c.p.s.

The disc 32 possesses a compound mode of oscillation which includes an orbital component and a vertical component. Accordingly, a dynamic orifice of revolution is generated, the orifice of revolution being formed between the lower surface of polished disc 32 and the cooperating sealing ring assembly 26. In addition, the dynamic orifice 40 possesses variable rectilinear dimensions due to the vertical component of vibration. Dynamic orifice 40 varies in height from an opening of zero to a maximum of less than 4 microns (i.e. the amplitude of vibration of the rubber in the sealing ring assembly 26 is nearly 4 microns) as determined by a multiplicity of variable parameters such as the spring coefficients of the materials involved, static pressures, prepressure by torque, fluid states and so forth. The circumference of dynamic orifice 40 is substantially 11 inches. It should be understood that during any given instant of operation the dynamic orifice 40 is partially open and partially closed. In other words, a given sector or portion of the dynamic orifice may be fully open (i.e. to a height of nearly 4 microns) while another sector may be fully closed and yet another sector may be partially open. In addition, the motion is completely random in nature. Accordingly, the cells will be radially discharged in the shape of ribbons or streams, rather than in the shape of a fully-formed disc or wafer of cells.

Since the maximum height of dynamic orifice 40 is less than 4 microns, it is apparent that the amount or quantity of cell discharge in any given period will necessarily be small. Thus, it will be difficult for the individual cells to buffer or cushion one another during discharge because they simply do not possess the requisite bulk of volume to cushion each other against the severe disruptive forces which await them.

In addition, the cells are compelled by the inherent nature of the dynamic orifice 40 to assume a thin-film configuration as they are discharged. This thin-film radial emission of the cell mass actually assumes a shape in which the thickness of the film is essentially monomolecular. Thus since the discharging cell mass is essentially two-dimensional rather than being of a multilayer three-dimensional configuration, the possibility of cell buffering in the vertical plane is eliminated. Consequently, each discharge cell is exposed to an explosive or disruptive decompression force which should be sufficient to liberate the subcellular components which are encapsulated within the cell. Therefore, by ensuring both "quantity" and "shape" control of the cell mass, the present invention has succeeded in obviating the cell buffering problem which has plagued prior cell disruption attempts.

Moreover, when the cells undergo this thin fluid radial discharge of monomolecular to monocellular thickness, any tendency toward excessive heating of the cells due to friction is obviated by the present invention. A heating increase is prevented by the nature of the dynamic orifice 40 as well as by the polished disc, the entire surface of which functions as a heat sink or heat absorber for the heat which is generated during cell discharge. The resilient O-ring 28 also assists in the heat-sinking procedure. The dynamic orifice 40 comprises a variable opening which is much less likely to encourage excessive heating than is a pinhole opening through which a mass of cells must be squeezed or extruded, especially where this pinhole is approximately 50 millionths of an inch in diameter. Also, it is apparent that the surface area of the disc will significantly assist in the elimination of the excessive heating problem. Accordingly, the possiblity of denaturation which is caused by excessive heating, as well as the necessity of freezing the cell mass to prevent denaturation, has been eliminated by the present invention.

The mode of oscillation of the polished disc 32 results in intermittent discharge of incremental portions of the cellular mass. The discharge cells come into communication with a plurality of radial slots 36 which are formed at spaced intervals in the lower surface of a threaded disc nut 34. Each of the radial slots 36 is slightly more than 1 inch in length and has a height and width of .12 inches. The disc nut 34 has an overall diameter of approximately 4.5 inches and consists of brass and an alloy of nickel.

The disc nut 34 is set at a predetermined torque, the range of which will be on the order of 5 to 25 foot pounds, depending upon the static pressure which is desired prior to and during discharge of the cells from the cavity 22. A representative charge of the inter-relation between the torque and the static pressure is as follows:

| Torque | | Static pressure prior to and during extrusion |
|---|---|---|
| 5 ft. lbs | p.s.i | 6,000 |
| 10 ft. lbs | do | 10,000 |
| 15 ft. lbs | do | 14,000 |

Each incremental portion of the cell mass which has discharged through dynamic orifice 40 to radial slots 36 is then exposed to a relatively low pressure environment 38, which may be maintained at atmospheric pressure simply by providing an ambient air space. If desired, environment or area 38 could be maintained at lower than atmospheric pressures by the inclusion of suitable vacuum-creating means (which are not shown in the drawings).

Thus, the exposed cell structures are subjected to a sudden, substantial decrease in pressure which disrupts or explodes the cellular structure, thereby liberating the subcellular components. These components are then collected in any suitable manner and processed for subsequent use.

The cell disruption process can be either continuous or batch. An industrial disruption device would be on-stream or continuous and would not have to be reopened for charging. The device would utilize a multiplicity of cylinders in much the same way as does an engine. There would be staging from a lower to higher pressure, at which point the discharge or extrusion of the cell mass would occur. An industrial machine using staging cylinders would have a cell mass of several gallons volume. The volume of the cell mass in a laboratory device would be from 50 to 100 milliliters.

The cell mass must normally be maintained at the pressure of at least 10,000 p.s.i. when animal cells (such as mouse liver cells) are being disrupted, for a period which could vary from one second to 30 minutes (depending upon the particular microbial form which is being disrupted) prior to initiating the cell discharge. When plant cells are used, the pressure is normally maintained between approximately 12,000 p.s.i., and 20,000 p.s.i., once again depending on the microbial form being disrupted. If desired, the pressure applied can be as high as 35,000 p.s.i.

It is apparent therefore, that the "oscillator-discharge explosive decompression" of the present invention constitutes an effective solution to the longstanding problem of ensuring a high yield of subcellular components without damaging the constituents of the cell.

Although the Method and Apparatus for Disrupting Cells has been described with reference to a particular embodiment, it will become apparent to those skilled in the art that variations can be made therein. All such variations as would be obvious to those skilled in this art are intended to be included within the scope of this invention.

I claim:
1. A method of disrupting the cellular structure of a mass of cells comprising the steps of:
    confining said mass of cells under relatively high pressure;
    intermittently discharging a portion of said mass of cells to a relatively low pressure environment by oscillation at a frequency which is sufficiently high to permit said intermittent discharge, wherein said discharged cells are disrupted due to rapid decompression caused by the exposure of said discharged cells to said relatively low pressure environment; and
    collecting said disrupted cells for the purpose of subsequent processing.

2. The method of claim 1 in which said mass of cells are intermittently discharged by a natural frequency of oscillation.

3. The method of claim 2 in which said natural frequency of oscillation is at least 8,000 c.p.s.

4. The method of claim 1 in which said mass of cells are intermittently discharged by a controlled frequency of oscillation.

5. The method of claim 4 in which said controlled frequency of oscillation is at least 15 c.p.s.

6. The method of claim 1 in which said mass of cells is comprised of plant cells.

7. The method of claim 6 wherein said plant cells are in the form of a viscous paste.

8. The method of claim 1 in which said mass of cells is comprised of animal cells.

9. The method of claim 8 wherein said animal cells are in the form of a viscous paste.

10. The method of claim 1 including the step of:
    maintaining said relatively high pressure on said mass of cells prior to discharge thereof.

11. The method of claim 10 in which:
    said mass of cells are maintained at a pressure of at least 10,000 p.s.i., and
    said relatively low pressure environment is at atmospheric pressure.

12. The method of claim 10 wherein said mass of cells are maintained at a relatively high pressure for a period of 1 second to 30 minutes, prior to initiating the intermittent discharge thereof.

13. The method of claim 10 including the step of:
    heat-sinking said mass of cells in order to prevent denaturation caused by excessive heating of said cell mass.

14. The method of claim 1 wherein said portion of said mass of cells constitutes a thin-film of essentially monocellular thickness, in order to eliminate the possibility of buffering in the vertical plane, thereby ensuring the exposure of each discharged cell to rapid decompression and disruption.

15. The method of claim 1 wherein said mass of cells is intermittently discharged through a dynamic orifice which is oscillated such that the height of said dynamic orifice varies from zero to a height of less than 4 microns.

16. Apparatus for disrupting the cellular structure of cells comprising:
    means for confining a mass of cells under relatively high pressure;
    means for maintaining a substantially uniform relatively high pressure on said mass of cells to be disrupted;
    dynamic orifice means cooperating with said confining means, said dynamic orifice means being in communication with a relatively low pressure environment, said dynamic orifice means being operable to oscillate at a frequency which is sufficiently high that a portion of said mass of cells under pressure is intermittently discharged into said relatively low pressure environment, the pressure of said environment being sufficiently low that said discharged cells are disrupted due to rapid decompression caused by the exposure of said discharged cells to said relatively low pressure environment; and
    means for collecting said disrupted cells for subsequent processing.

17. The apparatus of claim 16 in which said dynamic orifice means comprises:
    an oscillating member, said member being adapted to oscillate at a frequency which is sufficiently high that a portion of said mass of cells under pressure is intermittently discharged; and
    means cooperating with said oscillating member, for the purpose of periodically opening and closing said dynamic orifice means, in order to intermittently discharge said mass of cells to said relatively low pressure environment.

18. Apparatus for disrupting the cellular structure of cells comprising:
    means for confining a mass of cells under relatively high pressure;
    means for maintaining said relatively high pressure on said mass of cells to be discharged;
    dynamic orifice means cooperating with said confining means, said dynamic orifice means including an oscillating annular member, said member being adapted to oscillate at a frequency which is sufficiently high that a portion of said mass of cells under pressure is intermittently discharged and means cooperating with said oscillating member for the purpose of periodically opening and closing said orifice means in order to intermittently discharge said mass of cells to said relatively low pressure environment and said dynamic orifice means being in communication with a relatively low pressure environment, said dynamic orifice means being operable to oscillate at a frequency which is sufficiently high that a portion of said mass of cells under pressure is intermittently discharged into said relatively low pressure environment, the pressure of said environment being sufficiently low that said discharged cells are disrupted due to rapid decompression caused by the exposure of said discharged cells to said relatively low pressure environment; and
    means for collecting said disrupted cells for subsequent processing.

19. The apparatus of claim 18 in which said cooperating means includes:
    a tapered seat means for said annular oscillating member; and
    flexible sealing means positioned within said seat means, said sealing means contacting said annular oscillating member when said dynamic orifice means is in the closed position.

20. The apparatus of claim 19 in which said flexible sealing means comprises a ring assembly including:
    a resilient O-ring positioned within a concentric support ring, said support ring having an inner diameter which is greater than the outer diameter of said resilient O-ring, said support ring possessing a plurality of notches spaced along the outer periphery thereof, in order to prevent said O-ring from locking said ring assembly when torques or prepressures are applied to said ring assembly.

21. The apparatus of claim 20 wherein said annular oscillating member comprises a polished disc.

22. The apparatus of claim 21 wherein said dynamic orifice means communicates with said relatively low pressure environment by means of a plurality of radial slots which are formed at spaced intervals in the lower surface of a disc nut, said disc nut being threadedly engaged within a housing member and positioned adjacent to said polished disc of said apparatus for the purpose of securing said polished disc within said housing member.

23. The apparatus of claim 21 in which said polished disc and said resilient O-ring is adapted to function as a heat sink in order to prevent denaturation of said mass of cells caused by excessive heating of the cells.

24. The apparatus of claim 18 in which said annular oscillating member is adapted to oscillate at a natural frequency which is determined by the dimensions of said annular oscillating member and said cooperating means.

25. The apparatus of claim 24 wherein said natural frequency is at least 8000 c.p.s.

26. The apparatus of claim 18 in which said annular oscillating member is adapted to oscillate at a controlled frequency.

27. The apparatus of claim 26 wherein said controlled frequency is at least 15 c.p.s.

28. The apparatus of claim 16 in which:
    said maintaining means maintains said mass of cells at a pressure of at least 10,000 p.s.i., and
    said low pressure environment is at atmospheric pressure.

29. The apparatus of claim 17 in which said oscillating member is adapted to oscillate such that said mass of cells are intermittently discharged in a radial direction around the outer periphery of said oscillating member.

30. The apparatus of claim 17 in which the mode of oscillation of said oscillating member is such that only a thin film of said cell mass is intermittently discharged, said thin film being essentially of monocellular thickness, thus precluding the possibility of buffering in the vertical plane, in order to ensure that each discharged cell is exposed to rapid decompression and disruption.

31. The apparatus of claim 21 in which said polished disc is adapted to undergo a compound mode of oscillation, said compound mode including an orbital component and a vertical component, thereby generating a dynamic orifice of revolution, as well as a dynamic orifice which is variable in rectilinear dimensions.

32. The apparatus of claim 18 in which the height of said dynamic orifice means varies from zero to a height of less than 4 microns, and the circumference of said orifice means is substantially 11 inches.

33. Apparatus for disrupting the cellular structure of cells comprising:
    means defining an open-ended chamber for confining a mass of cells under relatively high pressure;
    means for maintaining said relatively high pressure on said mass of cells to be disrupted;
    dynamic orifice means disposed at the open end of said chamber for providing at least a single dynamic orifice between said chamber and a relatively low pressure environment, said orifice means being adapted to oscillate at a frequency which is sufficiently high so that said dynamic orifice is intermittently substantially closed and opened to a height not exceeding roughly 4 microns so that a portion of said mass of cells under pressure is intermittently discharged into said relatively low pressure environment, while said orifice is open, the pressure of said environment being sufficiently low that said discharged cells are disrupted due to rapid decompression caused by the exposure of said discharged cells to said relatively low pressure environment; and means for collecting said disrupted cells for subsequent processing.

34. Apparatus as in claim 33 wherein said orifice means is adapted to oscillate so that at least some sectors of said orifice do not have the same height at the same time.